US012406378B2

(12) United States Patent
Iseki

(10) Patent No.: US 12,406,378 B2
(45) Date of Patent: Sep. 2, 2025

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Akane Iseki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 458 days.

(21) Appl. No.: 17/723,853

(22) Filed: Apr. 19, 2022

(65) Prior Publication Data

US 2022/0343511 A1    Oct. 27, 2022

(30) Foreign Application Priority Data

Apr. 23, 2021    (JP) .................................. 2021-073655

(51) Int. Cl.
*G06T 7/246*    (2017.01)
*G06N 20/00*    (2019.01)

(52) U.S. Cl.
CPC ............. *G06T 7/246* (2017.01); *G06N 20/00* (2019.01); *G06T 2207/20081* (2013.01)

(58) Field of Classification Search
CPC ........... G06T 7/246; G06T 2207/20081; G06T 2207/10016; G06T 2207/20076;
(Continued)

(56) References Cited

U.S. PATENT DOCUMENTS

2010/0195870 A1*  8/2010  Ai ............................ G06T 7/277
                                                    382/103
2016/0180197 A1*  6/2016  Kim .......................... G01S 5/16
                                                    382/103
(Continued)

FOREIGN PATENT DOCUMENTS

JP          2005-44352 A      2/2005
JP          2008-262331 A    10/2008
(Continued)

OTHER PUBLICATIONS

Axel Sauer et al., "Tracking Holistic Object Representations" In: BMVC2019, Aug. 6, 2019.
(Continued)

*Primary Examiner* — Jennifer Mehmood
*Assistant Examiner* — Pardis Sohraby
(74) *Attorney, Agent, or Firm* — VENABLE LLP

(57) ABSTRACT

There is provided with an information processing apparatus. A tracking unit tracks a subject in an input image using one or both of a first discriminator that tracks the subject and a second discriminator that tracks the subject and is different from the first discriminator. An obtaining unit obtains training data used for training to track with the first discriminator. A learning unit performs online learning of causing the first discriminator to learn while tracking the subject using the training data. An evaluating unit evaluates a completeness of the online learning. A determination unit determines whether or not the tracking unit is to use the first discriminator to track the subject according to the evaluation of the completeness.

20 Claims, 6 Drawing Sheets

(58) Field of Classification Search
CPC . G06T 2207/20084; G06T 2207/30196; G06T 7/20; G06N 20/00; G06N 3/0464; G06N 3/045; G06N 3/08
USPC .......................................................... 382/103
See application file for complete search history.

(56) References Cited

U.S. PATENT DOCUMENTS

| | | | | |
|---|---|---|---|---|
| 2019/0095759 | A1* | 3/2019 | Kanada | G16H 50/70 |
| 2019/0197356 | A1* | 6/2019 | Kurita | G06F 18/2178 |
| 2021/0192348 | A1* | 6/2021 | Ishii | G06N 3/08 |
| 2021/0312642 | A1* | 10/2021 | Zhang | G06F 18/22 |
| 2022/0366576 | A1* | 11/2022 | Wang | G06T 7/248 |

FOREIGN PATENT DOCUMENTS

| | | |
|---|---|---|
| JP | 2011-34244 A | 2/2011 |
| JP | 2020-46928 A | 3/2020 |

OTHER PUBLICATIONS

Jinghao Zhou et al., "Discriminative and Robust Online Learning for Siamese Visual Tracking," Nov. 21, 2019.
Luca Bertinetto et al., "Fully-Convolutional Siamese Networks for Object Tracking," Jun. 30, 2016.
Japanese Office Action issued Feb. 14, 2025 during prosecution of related application 2021-073655 (English language machine translation included).

\* cited by examiner

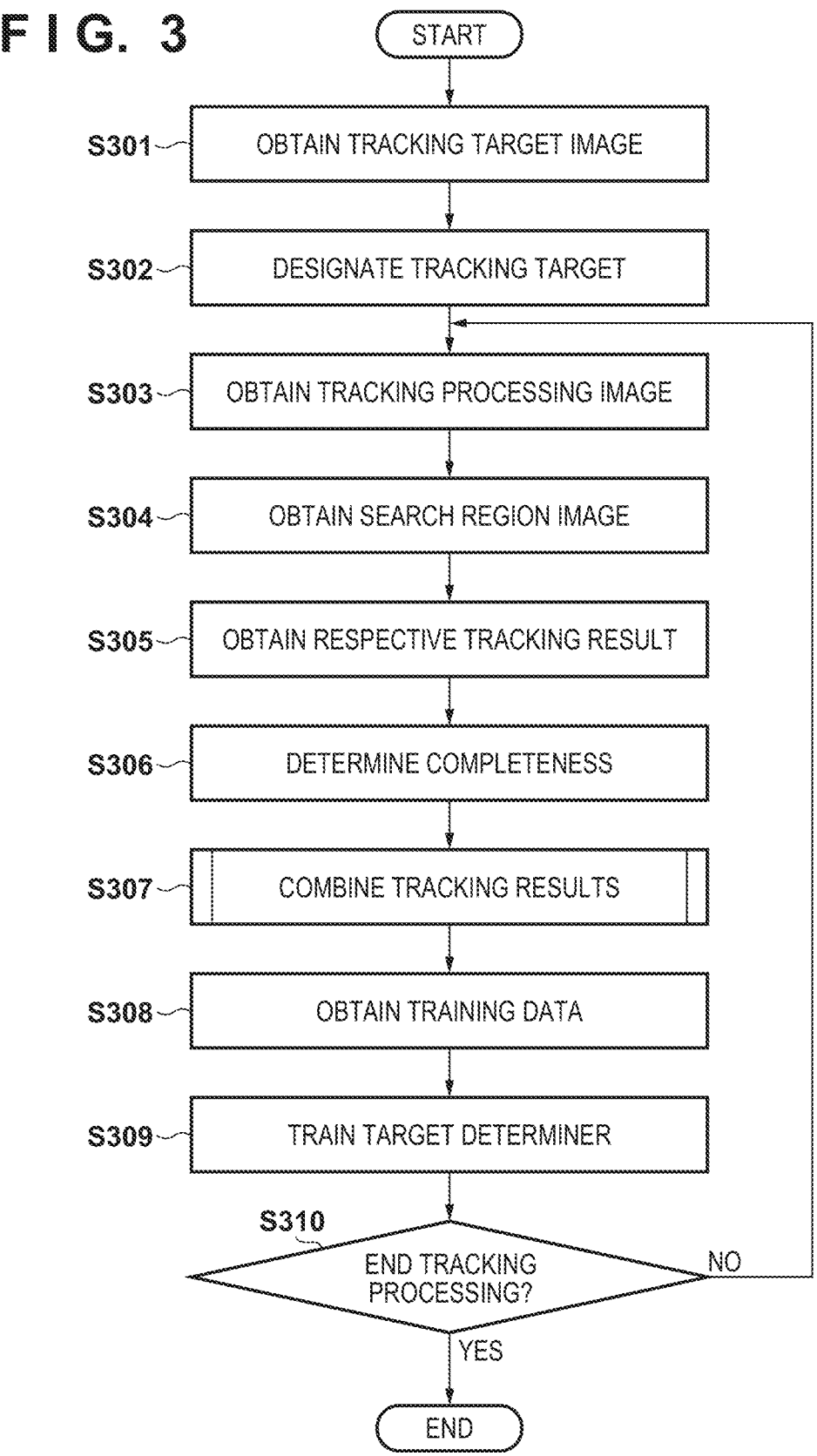

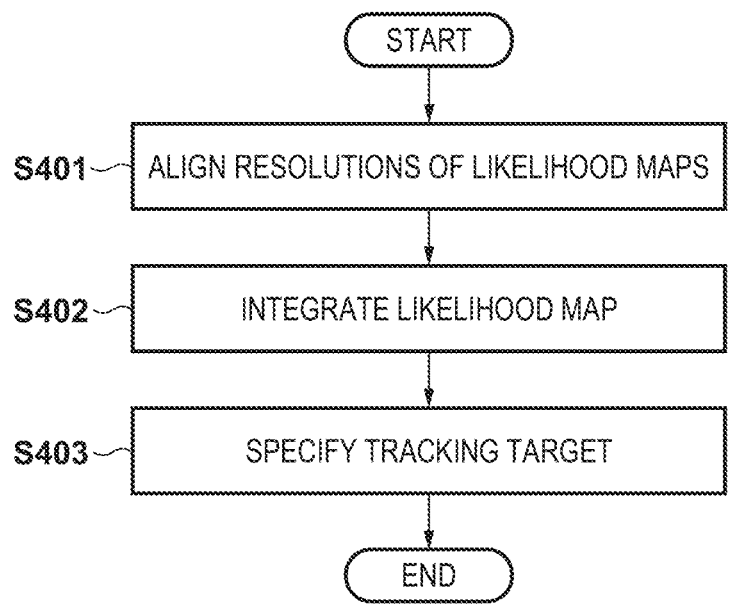
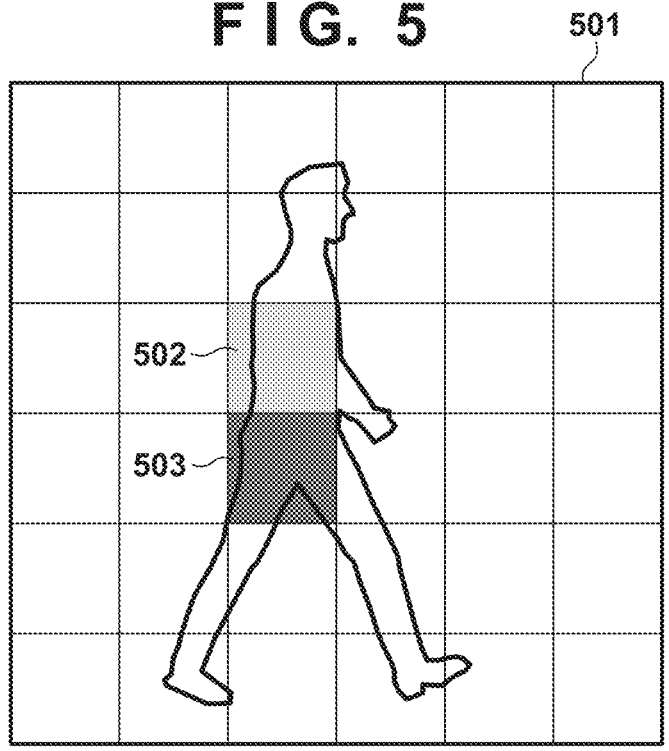

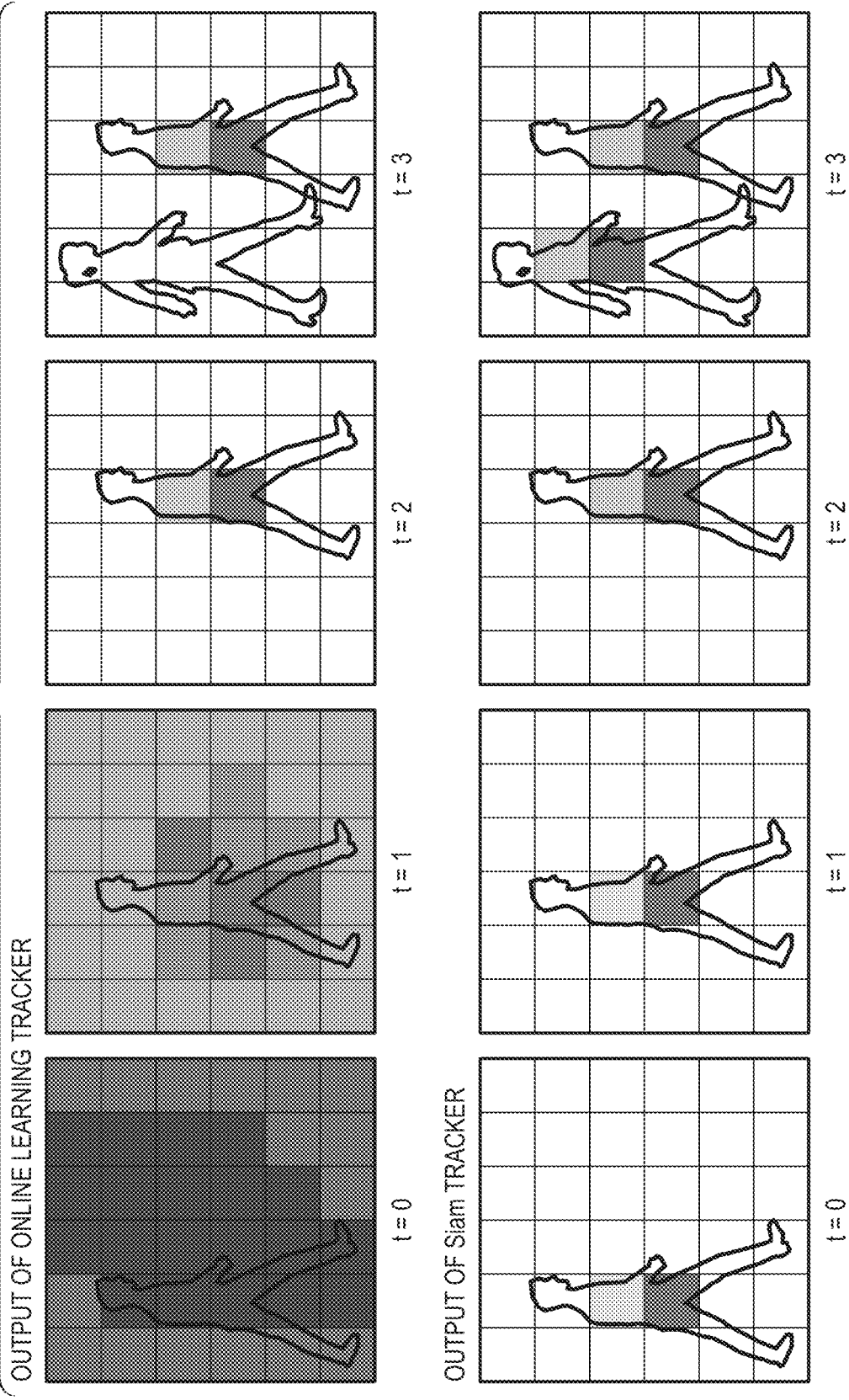

INFORMATION PROCESSING APPARATUS, INFORMATION PROCESSING METHOD, AND STORAGE MEDIUM

BACKGROUND OF THE INVENTION

Field of the Invention

The present invention relates to an information processing apparatus, an information processing method, and a storage medium.

Description of the Related Art

In recent years, techniques using Deep Neural Networks (DNNs) have attracted attention as highly-accurate tracking techniques. Online learning, in which identification results are stored for training and discriminators for a tracking target/non-tracking target are updated sequentially during tracking, is useful for improving tracking accuracy if the number of training sessions or the availability of training data is sufficient. Jinghao Zhou et al., "Discriminative and Robust Online Learning for Siamese Visual Tracking," discloses a technique for highly-accurate tracking by combining a pre-learned tracking method, as described in Luca Bertinetto et al., "Fully-Convolutional Siamese Networks for Object Tracking," with an online learning tracking method. The offline learning method described by Luca Bertinetto et al. will be referred to here as "Fully-Convolutional Siamese Networks for Object Tracking" (the "Siamese tracking method"). In addition, Japanese Patent Laid-Open No. 2008-262331 discloses a technique that combines a tracking method that performs online learning with a tracking method that only performs offline learning in order to improve tracking accuracy.

SUMMARY OF THE INVENTION

According to one embodiment of the present invention, an information processing apparatus comprises: a tracking unit configured to track a subject in an input image using one or both of a first discriminator that tracks the subject and a second discriminator that tracks the subject and is different from the first discriminator; an obtaining unit configured to obtain training data used for training to track with the first discriminator; a learning unit configured to perform online learning of causing the first discriminator to learn while tracking the subject using the training data; an evaluating unit configured to evaluate a completeness of the online learning; and a determination unit configured to determine whether or not the tracking unit is to use the first discriminator to track the subject according to the evaluation of the completeness.

According to one embodiment of the present invention, an information processing method comprises: tracking a subject in an input image using one or both of a first discriminator that tracks the subject and a second discriminator that tracks the subject and is different from the first discriminator; obtaining training data used for training to track with the first discriminator; performing online learning of causing the first discriminator to learn while tracking the subject using the training data; evaluating a completeness of the online learning; and determining whether or not to use the first discriminator to track the subject according to the evaluation of the completeness in the tracking.

According to one embodiment of the present invention, a non-transitory computer-readable storage medium stores a program that, when executed by a computer, causes the computer to perform an information processing method, the information processing method comprises: tracking a subject in an input image using one or both of a first discriminator that tracks the subject and a second discriminator that tracks the subject and is different from the first discriminator; obtaining training data used for training to track with the first discriminator; performing online learning of causing the first discriminator to learn while tracking the subject using the training data; evaluating a completeness of the online learning; and determining whether or not to use the first discriminator to track the subject according to the evaluation of the completeness in the tracking.

Further features of the present invention will become apparent from the following description of exemplary embodiments (with reference to the attached drawings).

BRIEF DESCRIPTION OF THE DRAWINGS

FIG. 3 is a flowchart illustrating an example of a processing method according to the first embodiment.

FIG. 4 is a flowchart illustrating an example of likelihood map integration processing according to the first embodiment.

FIG. 5 is a diagram illustrating an example of a likelihood map generated by the information processing apparatus according to the first embodiment.

FIG. 6 is a diagram illustrating an example of a likelihood map with the passage of time according to the first embodiment.

DESCRIPTION OF THE EMBODIMENTS

Figure 1:
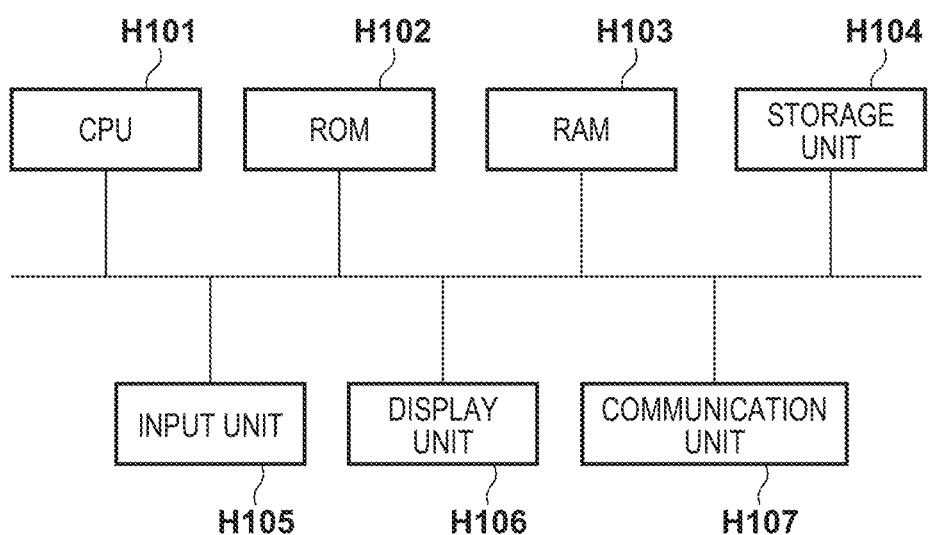
FIG. 1 is a diagram illustrating an example of the hardware configuration of an information processing apparatus according to a first embodiment.

However, if the number of training sessions or the availability of training data is insufficient, the tracking accuracy of tracking using online learning may be lower than that which does not use online learning. As a result, when there is insufficient training data or an insufficient number of training sessions, such as in the early stages of tracking, the combination of online learning and tracking may result in a decrease in tracking accuracy.

An embodiment of the present invention provides an information processing apparatus having a plurality of discriminators, including a discriminator that performs online learning, for tracking a subject, the information processing apparatus appropriately selecting a discriminator to be used for tracking according to a completeness of the online learning.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached draw-

First Embodiment

In the present embodiment, using online learning, a subject (a tracking target) in an input image is tracked, and during this tracking, a discriminator that identifies the tracking target/non-tracking target in the image is sequentially updated. In order to track a subject, candidate regions for tracking targets are extracted from the image to serve as search ranges for the subject, and the region where the tracking target is present is determined by calculating a tracking target likeness for each extracted candidate region. However, the method of tracking a subject using a discriminator that performs online learning is not particularly limited thereto, and tracking may be performed using any publicly-known method, such as tracking using template matching, for example.

On the other hand, in online learning, at stages where the number of training sessions is extremely small, it is difficult for a discriminator to fit with the training data. In addition, online learning is prone to instability at stages where there is extremely little training data. Furthermore, there are cases where fitting the discriminator to training data does not produce an appropriate discriminating surface, such as when there is dissociation between the distribution of the possible appearances of the tracking targets and non-tracking targets and the distribution of the training data. Such a state will be referred to as a "state in which online learning is not complete" hereinafter.

An information processing apparatus 1 according to the present embodiment includes a first tracking unit (discriminator) that performs tracking by online learning, and a second tracking unit (discriminator) that is different from the first tracking unit, and uses either or both of these discriminators to track a subject. When the online learning of the first tracking unit is not complete, the information processing apparatus 1 suppresses the occurrence of erroneous tracking by not using the first tracking unit for tracking, and instead using the second tracking unit to track the subject. In light of this, the information processing apparatus according to the present embodiment evaluates the completeness of online learning in the first tracking unit that performs tracking using online learning. Next, the information processing apparatus determines whether to use the first tracking unit to track the subject according to the evaluation of the completeness. The configuration of and processing by such an information processing apparatus will be described hereinafter with reference to FIGS. 1 to 7.

Note that in the present embodiment, the second tracking unit is assumed to have been trained in advance, rather than having undergone online learning. Here, the method of learning of the second tracking unit is not particularly limited, and the format of learning of the second tracking unit (whether online learning is performed or not) is not particularly limited either. In the present embodiment, the second tracking unit is pre-trained to track using the Siamese tracking method described by Luca Bertinetto, which detects, as the likeness of a tracking target, cross-correlations between features extracted by a CNN from a template image of a tracking target and each of candidate regions. Note that a case where the format of the training of the second tracking unit is different, or the number of second tracking units is more than two, will be described in a third embodiment.

FIG. 1 is a block diagram illustrating an example of the hardware configuration of the information processing apparatus according to the present embodiment. The information processing apparatus 1 according to the present embodiment includes a CPU 101, ROM 102, RAM 103, a storage unit 104, an input unit 105, a display unit 106, and a communication unit 107. The CPU 101 executes a control program stored in the ROM 102 and controls the overall processing performed by the information processing apparatus 1. The RAM 103 functions as a storage region or a work area for temporarily storing various types of data resulting from processing performed by each functional unit. The storage unit 104 is a storage region for storing various types of data, and the medium used is, for example, an HDD, flash memory, and various types of optical media, or the like. The input unit 105 is constituted by, for example, a keyboard, a touch panel, a dial, or the like, and accepts inputs from a user. The user can make user inputs, such as setting a tracking target, via the input unit 105. The display unit 106 is a liquid crystal display, for example, and presents various processing results, such as a subject, tracking results, and the like, to the user. The information processing apparatus 1 can also communicate with external apparatuses such as an image capturing apparatus or the like via the communication unit 107. This communication may be wireless communication over a network or priority communication, or the information processing apparatus 1 may have an image capturing function.

Figure 2:
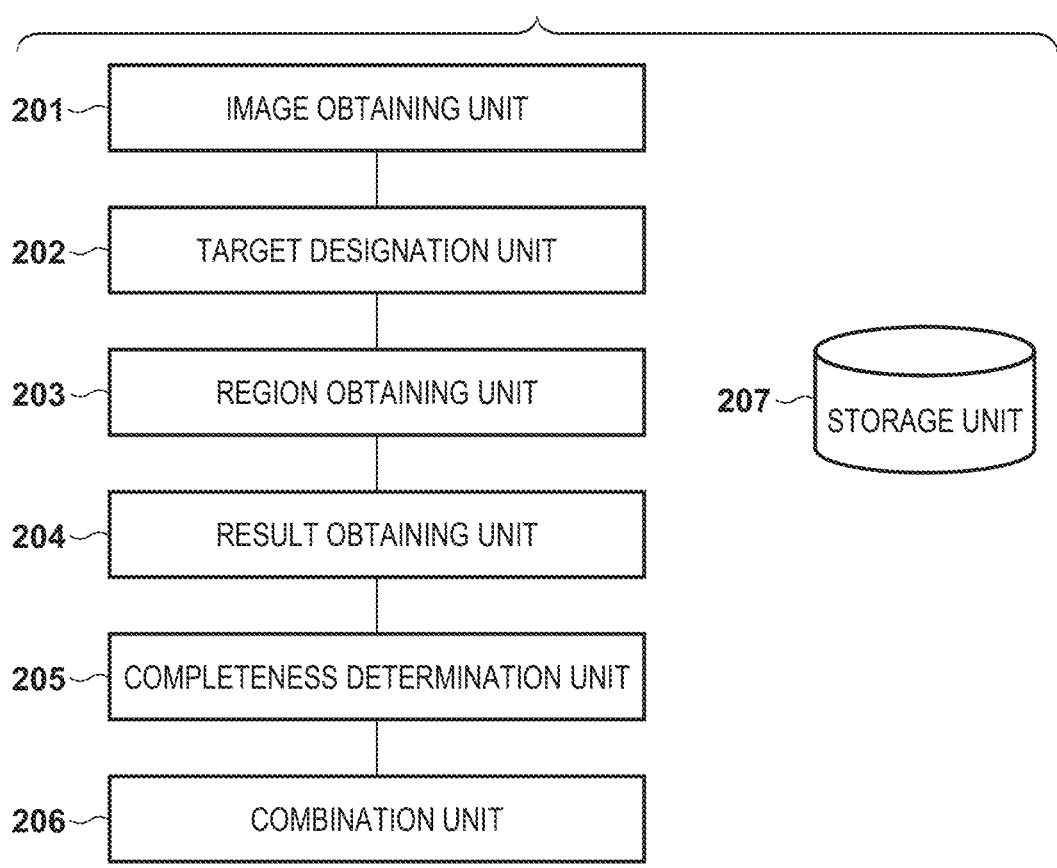
FIG. 2 is a diagram illustrating an example of the functional configuration of the information processing apparatus according to the first embodiment.

The functions of the information processing apparatus 1 according to the present embodiment will be described next with reference to FIGS. 2 and 3. FIG. 2 is a block diagram illustrating an example of the functional configuration of the information processing apparatus 1 according to the present embodiment. FIG. 3 is a flowchart illustrating an example of processing performed by the information processing apparatus 1 according to the present embodiment. The information processing apparatus 1 according to the present embodiment includes a first tracking unit that performs tracking by online learning as described above and a second tracking unit that is different from the first tracking unit, and uses these tracking units to track a tracking target. Note that in the present embodiment, the second tracking unit is not subject to online learning, and is instead assumed to have been trained to detect a subject in advance.

In step S301, an image obtainment unit 201 obtains an image for setting the tracking target. The image obtainment unit 201 may obtain an image from an image capturing apparatus connected to the information processing apparatus 1, may obtain an image stored in the storage unit 104, or may capture an image using an image capturing unit (not shown).

In step S302, a target designation unit 202 determines the tracking target in the image obtained in step S301. Here, the target designation unit 202 can determine the tracking target in response to an instruction designated through the input unit 105 (e.g., by touching a subject displayed in the display unit 106). The target designation unit 202 generates a template that represents features of the determined tracking target. In the subsequent tracking processing, the tracking target determined in step S302 is tracked.

In step S303, the image obtainment unit 201 obtains the image for tracking (here, the image that includes the tracking target determined in step S302 in an image capture range). In step S304, a region obtainment unit 203 determines a region to search for the tracking target (a search region) and cuts out the determined region from the image obtained in step S303. Here, the region obtainment unit 203 may set the search region as the entire image obtained in step S303, or as the vicinity of the position of the tracking target in the immediately preceding processing (e.g., a predetermined range centered on the tracking target).

In step S305, a result obtainment unit 204 tracks the subject using both the first tracking unit and the second tracking unit. Here, the first tracking unit generates a likelihood map from the image of the search region obtained in step S303 using a target determiner. The second tracking unit calculates an interrelationship between the template obtained in step S302 and the image of the search region obtained in step S303, and obtains a likelihood map indicating the probability of the subject being present at each position. The details of the processing performed by the first tracking unit will be described later with reference to FIG. 3, but the tracking method by these tracking units is not particularly limited, and any publicly-known tracking method may be employed. Here, it is assumed that the second tracking unit performs tracking by using the Siamese tracking method described in Luca Bertinetto as mentioned above, with method that uses at least one template of a tracking target to distinguish between the tracking target and non-tracking targets.

In step S306, a completeness determination unit 205 calculates the completeness of the first tracking unit. In step S307, a combination unit 206 determines whether or not to use the first tracking unit to track the tracking target based on the completeness of the tracking unit calculated in step S305, and calculates a final likelihood map to ultimately be used for tracking according to the result of the determination. The processing of calculating the completeness and the processing of determining whether or not to use the first tracking unit based on the completeness will be described later. Here, the descriptions will assume that the combination unit 206 uses the first tracking unit for tracking, and based on the completeness of each tracking unit, the likelihood maps obtained from the tracking units in step S305 are integrated to generate a single likelihood map. The combination unit 206 then detects the region with the highest likelihood as the tracking target. In step S308, the combination unit 206 obtains training data used for training the target determiner of the first tracking unit from the image of the search region and stores the training data in a storage unit 207. Next, in step S309, the combination unit 206 performs learning using the training data stored in the storage unit 207. The learning processing of the first tracking unit will be described in detail later. In step S310, the combination unit 206 determines whether or not to end the tracking processing. If the processing is not to be ended, the sequence returns to step S303 and the tracking processing is continued. The combination unit 206 may determine whether or not to end the tracking processing, for example, by obtaining input from the user, or may determine to end the processing when the tracking has been performed for a predetermined time, and the criteria for the determination may be set by the user as desired.

The learning in the first tracking unit, performed in steps S306, S307, S308, and S309, will be described hereinafter. The first tracking unit inputs a feature map calculated from the image in the search region using a CNN or the like to the target determiner, and obtains the likelihood map. Here, the feature map is a three-dimensional tensor of a width Wfx, a height Hfx, and a number of channels Cf, and is an array of C-dimensional vectors representing the features of each of subregions obtained by dividing the image of the search region into a grid having a width Wf and a height Hf. The "likelihood map" is a map that responds strongly to a region, in the search region, where there is a high probability that the tracking target is present. Each cell (subregion) of the feature map and likelihood map corresponds to a feature and a likelihood, respectively, of the subregion obtained by dividing the image of the search region into a grid.

In step S306, the completeness determination unit 205 calculates the completeness of the online learning of the first tracking unit according to the learning status of online learning. In the present embodiment, an amount of change in loss to be calculated in the learning by the first tracking unit before and after new training data is input is calculated, and if this amount of change is less than or equal to a predetermined threshold, the completeness is considered to be 1; otherwise, the completeness is considered to be 0. Here, the evaluation is based on a binary discrimination of whether the completeness is 1 (online learning is complete) or 0 (online learning is not complete). For the image at the start of tracking, the completeness determination unit 205 sets the completeness of the first tracking unit to 0. For example, when an amount of change ΔL in the total loss value before and after a parameter update in the learning of the first tracking unit is smaller than a predetermined value, the learning is determined to be complete, and the completeness is set to 1. ΔL is calculated, for example, as follows.

$$\Delta L = |L_{t-i} - L_t| \quad (1)$$

Here, $L_t$ is the loss value at a tth iteration. "Iteration" refers to the number of times a parameter has been updated since the start of tracking. Here, when ΔL is less than the predetermined threshold, the completeness is considered to be 1, and the learning of the first tracking unit is determined to be sufficiently complete by the tth instance of learning; however, the criteria for this determination is not particularly limited thereto. For example, the completeness determination unit 205 may assume that the completeness is 1 when an average of ΔL over several iterations is smaller than the predetermined threshold. The completeness determination unit 205 may also determine that the completeness is 1 when the loss value is smaller than a predetermined value.

Here, it is assumed that it is sufficient to calculate the completeness for the first tracking unit, but the completeness may be obtained for the second tracking unit as well, considering that the completeness will be used for a weighted sum of the likelihood map (described later). As described above, the completeness determination unit 205 according to the present embodiment is described as using a binary discrimination of whether or not the first tracking unit is complete, but the completeness may be output as a continuous value between 0 and 1 (with values closer to 1 indicating higher completeness) based on the magnitude of the loss value or the like. For the second tracking unit that does not perform online learning, the completeness may be set to 1 from the start of tracking, whereas for the first tracking unit, the completeness may be set to 0 at the start of tracking.

The flowchart in FIG. 4 illustrates an example of the processing of combining tracking results performed in step S307. First, in step S401, the combination unit 206 aligns the resolutions of the likelihood maps output by each tracking unit in step S305 using any desired method, such as bilinear interpolation. Next, in step S402, the combination unit 206 obtains the value of each cell of the likelihood map (the final likelihood map) ultimately to be used based on the completeness of each tracking unit calculated in step S306. Here, the combination unit 206 obtains the final likelihood map by integrating the likelihood map calculated by the first tracking unit with the likelihood map calculated by the second tracking unit. If the completeness of the first tracking unit is 0, the combination unit 206 employs the likelihood map calculated by the second tracking unit as the final likelihood map.

Here, the completeness is output as a continuous value, and the combination unit 206 performs processing of obtaining the final likelihood map by calculating a weighted sum of the values of each cell of the likelihood map using the value of the completeness calculated by each tracking unit as a weighting coefficient. Such processing makes it possible to limit the rate at which the tracking results by the first tracking unit are reflected in the final likelihood map while the online learning of the first tracking unit is less complete, and to increase that rate as the completeness improves.

Next, in step S403, the combination unit 206 estimates the region with the highest likelihood as the tracking target and other regions as non-tracking targets, after which the sequence moves to step S308. FIG. 5 illustrates an example of the integrated likelihood map. In a likelihood map 501, a tracking target 502 is displayed, and the likelihood of a cell 503 near the center of the tracking target 502 is displayed in black, indicating a high value. In this case, the tracking target 502 can be estimated to be located in the cell 503, where this correlation value is the highest. Here, a method of calculating a weighted sum of the likelihood maps is given as an example of the method for integrating the likelihood maps into a single final likelihood map, but the method is not particularly limited, as long as the method is an integration method that reflects the respective likelihood values, such as finding the product of the likelihood maps.

In step S308, the combination unit 206 first labels each cell of the image in the search region with the result of identifying a tracking target/non-tracking target in step S403. The combination unit 206 may selectively use only the result of the first tracking unit or only the result of the second tracking unit as the identification result according to the completeness as described above.

The learning processing performed by the first tracking unit in step S309 will be described in detail next. First, the combination unit 206 obtains a plurality of sets of feature amounts and labels, which are training data, from the storage unit 207. The combination unit 206 then inputs the feature amounts to the target determiner to obtain the likelihood of the tracking target likeness, and then calculates the loss based on the likelihood and the label. The combination unit 206 then updates the parameters of the target determiner using the gradient method based on the calculated loss. This processing is similar to general learning processing, and will therefore not be described in detail.

The loss function is designed such that the loss is small when the tracking target is correctly estimated, and the loss value is large when a non-tracking target is estimated to be a tracking target, a tracking target is estimated to be a non-tracking target, or the like. A loss value L can be expressed, for example, as the following Formula (2).

$$L_t = \frac{1}{N_t} \sum_{i=1}^{N_t} loss_t^i, \text{ where } loss_t^i = (C_{in} - C_{gt})^2 \quad (2)$$

Here, $L_t$ is the loss value at the tth iteration, $N_t$ is the number of training data used to calculate the loss value at the tth iteration, and $loss_t^i$ is the loss pertaining to the ith instance of training data. $C_{in}$ is the likelihood of the tracking target of the ith instance of training data calculated in step S308, and $C_{gt}$ is the label of the ith instance training data. The loss value $L_t$ calculated here is used to determine the completeness. Formula (2) is merely an example, and the formula for calculating the loss is not limited thereto.

The descriptions here assume that online learning is completed when the completeness of the first tracking unit becomes 1, which is the timing of the end of learning, but the conditions for completing online learning are not particularly limited thereto. For example, the combination unit 206 may determine the number of parameter updates in advance, and end the learning processing when the number of iterations t reaches a predetermined value, assuming that the online learning is complete.

Additionally, the information processing apparatus 1 may continue learning in parallel with the processing of step S303, step S304, or the like, but is not limited thereto. The updated parameters are stored in the storage unit 207 as learned parameters. Although the first tracking unit has been described as sequentially updating the parameters of the target determiner using the gradient method, a different method may be used as long as the method sequentially updates the discriminating surface of the tracking target/non-tracking target using the data of the tracking target/non-tracking target obtained during tracking.

According to this configuration, the completeness of the first tracking unit that performs online learning can be calculated, and the first tracking unit and the second tracking unit can be combined, or either one can be used for tracking, according to the calculated completeness. Therefore, by not using the first tracking unit for tracking when the first tracking unit is not complete, it is possible to suppress a drop in tracking accuracy caused by using a less complete tracking unit. Additionally, even when the first tracking unit is used for tracking, performing weighted integration of the likelihood maps according to the calculated completeness makes it possible to adjust the rate of reflecting the tracking results from the first tracking unit in the final tracking results according to the completeness.

Figure 7:
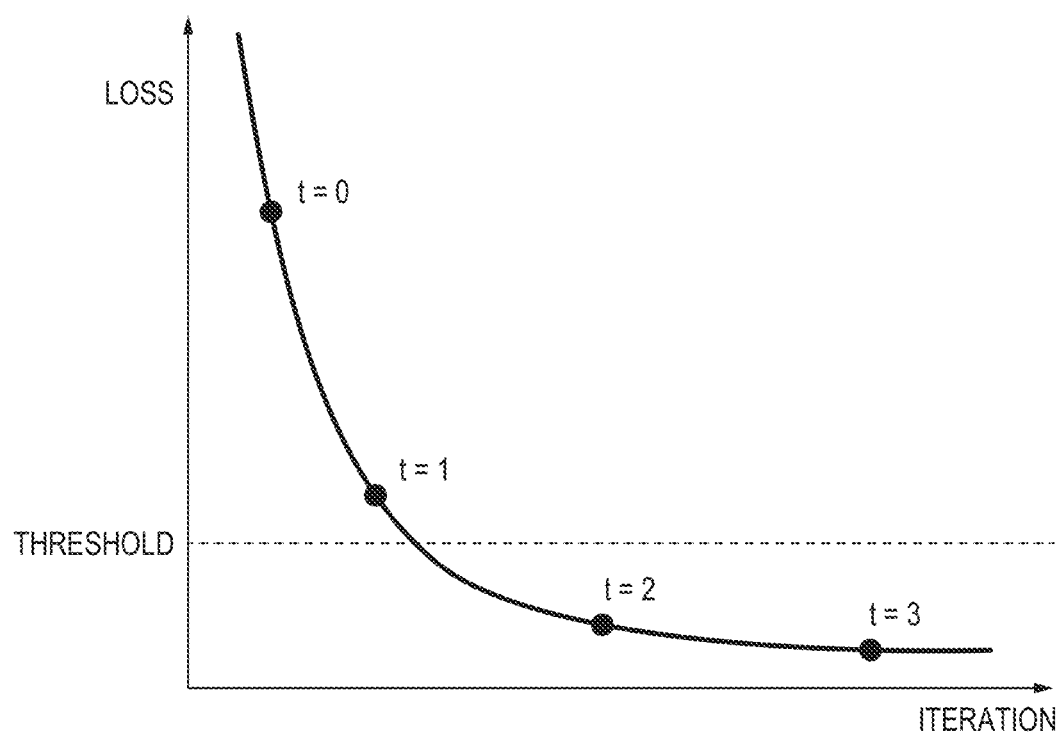
FIG. 7 is a diagram illustrating an example of time variation of loss in online learning according to the first embodiment.

As described above, the information processing apparatus 1 according to the present embodiment combines the tracking units used for tracking according to the completeness of the first tracking unit that performs online learning. The principle of suppressing a drop in the tracking accuracy through such processing will be described hereinafter with reference to FIGS. 6 and 7. FIG. 6 illustrates the likelihood map obtained as the output of the first tracking unit and the likelihood map obtained as the output of the second tracking unit when time t is 0, 1, 2, and 3, respectively. The likelihood map indicates regions having a with high likelihood of the tracking target with darker colors. FIG. 7 illustrates the time variation of loss due to the first tracking unit, corresponding to time t.

In the example in FIG. 6, first, in the initial stage of learning (t=0), a peak position of the likelihood map matches the position of the tracking target in the second tracking unit. On the other hand, in the first tracking unit, as illustrated in FIG. 7, the discriminator that distinguishes between the tracking target and the non-tracking target has not been trained extensively, and it is easy for the likelihood of a region other than the tracking target to be high in the likelihood map. Therefore, erroneous tracking is more likely to occur if the likelihood map of the first tracking unit is used for tracking.

However, after the online learning progresses following the initial tracking period (e.g., the period where t is from 0 to 2), the likelihood map of the first tracking unit is able to distinguish between the tracking target and non-tracking targets. In particular, at time t=3, when the tracking target and objects similar thereto are in close proximity, with the likelihood map of the second tracking unit, the tracking processing reacts to both the tracking target and the objects similar thereto and may therefore result in erroneous tracking. On the other hand, with the likelihood map of the first tracking unit, the tracking target and objects similar thereto can be distinguished as a result of the sufficient online learning. Therefore, in this case, using the likelihood map of the first tracking unit (or integrating the likelihood maps of both tracking units) makes it possible to suppress erroneous tracking.

First Variation

The combination unit 206 may also assume that online learning is complete when a number N of training data stored in the storage unit 104 exceeds a predetermined number, or when a variation $\sigma$ of feature amounts in the training data exceeds a predetermined number. The variation $\sigma$ can be calculated as the sum of eigenvalues $\lambda_i$ (i=1, 2, . . . , d) of a covariance matrix of the feature amounts, through the following Formula (3), for example.

$$\sigma = \sum_{i=1}^{d} \lambda_i \quad (3)$$

Here, d is the number of dimensions of the feature amount. For this variation $\sigma$, all eigenvalues may be used as in Equation (3), or only a predetermined upper number of eigenvalues may be used, arranged in order from the highest eigenvalue, and the desired extraction processing can be performed. In this example, using a threshold thN or th$\sigma$, the completeness of the first tracking unit is set to 1 if either N>thN, $\sigma$>th$\sigma$, or both are satisfied; otherwise, the completeness is set to 0.

In addition, although the present embodiment describes the number of instances of training data, the measurement of variation in feature amounts, the setting of thresholds, and comparisons with the thresholds as being performed for each tracking target, this processing may be performed for each tracking target and non-tracking target. The subject of category classification by the information processing apparatus 1 according to the present embodiment is not limited to the tracking target/non-tracking target, and may include three or more desired classification categories, such as tracking target/objects similar thereto/background, for example.

In addition, although the present embodiment describes the determination of the completeness and the update of the parameters of the first tracking unit as being made from the point in time when tracking is started, the timing of the start of this processing is not limited thereto, and may be linked to the convergence of learning, for example. In other words, the update of the parameters of the first tracking unit may be started at the timing when the training data is considered to have been collected, and the tracking by the first tracking unit may be started at the timing when the learning has converged.

In the initial stage of tracking, when the number of instances of training data is small or the visibility of the tracking target changes rapidly, the learning of the target determiner through online learning is likely to become unstable. For example, if learning is performed using training data having a special appearance in the initial stage of tracking, such as motion blur arising only in the images in the initial stage of tracking, it may become impossible to identify targets other than a tracking target having that special appearance. On the other hand, according to the processing described above, by using the tracking result of the first tracking unit after the number of training data or the variation of feature amounts has increased to a given extent, the distribution of the training data approaches the distribution that the tracking target/non-tracking target can take on, which makes it easier to suppress erroneous tracking.

Second Variation

In addition, the completeness determination unit 205 may calculate the completeness in the processing of step S306 according to a degree of fit, described below. Here, the "degree of fit" is defined as the degree of closeness of distribution between the feature amounts of newly-added training data and the feature amounts of stored training data. In this example, the completeness determination unit 205 quantifies a difference in the distribution between the newly-added training data and the stored training data, and determines that online learning is complete when this difference is smaller than a predetermined value. As the method of quantification, a separate CNN that discriminates between the newly-added training data and the stored training data may be used, or a measure of distance between distributions, such as Kernel Mean Matching, may be used.

According to such processing, by using the tracking result from online learning in the tracking, the distribution of the training data approaches the distribution which the tracking target/non-tracking target can take on, which makes it easier to suppress erroneous tracking.

Third Variation

In the determination of the completeness made in step S306, the completeness determination unit 205 may determine that online learning is complete when the change in the distribution of the feature amounts of the training data drops to a certain extent when new training data is added to the training data stored in the storage unit 207.

For example, the completeness determination unit 205 defines the change in the distribution of feature amounts by an amount of change $\Delta c$ in the center of the distribution and an amount of change $\Delta \sigma$ in the variation. Then, the completeness determination unit 205 sets the completeness to 1 when either or both of the amounts of change are smaller than predetermined thresholds (thc and th$\sigma$), and sets the completeness to 0 when such is not the case. $\Delta c$ and $\Delta \sigma$ are assumed to be defined as follows.

$$\Delta c = |C_{t-1} - C_t|, \text{ where } c_t = \frac{1}{N}\sum_{i=1}^{N} f_i \quad (4)$$

$$\Delta \sigma = |\sigma_t - \sigma_{t-1}| \quad (5)$$

Here, time t is the current time, N is a number of training samples obtained at time t, $f_i$ (i=1, 2, . . . , N) is a training sample obtained at time t, and $c_{t-1}$ and $c_t$ are variations of the training samples obtained at time t−1 and time t. $\sigma_{t-1}$ and $\sigma_t$ may be calculated using Formula (1). Note that the change in the distribution of the feature amounts is not limited thereto, and the change in the distribution may be defined using other values that vary with the distribution, such as using the average, variance, or the like of the feature amounts, for example.

According to this processing, online learning can be determined to be complete when the change in the distribution of feature amounts in the training data becomes smaller than the predetermined value. Therefore, tracking using the tracking result from the first tracking unit can be started at the stage when the distribution of the training data of the first tracking unit fits the distribution that the tracking target/non-tracking target can take, which makes it possible to suppress erroneous tracking.

Fourth Variation

The completeness determination unit 205 may adjust the weighting of tracking result combinations in the likelihood map according to the completeness of the first tracking unit when the completeness of the first tracking unit, even after the learning of the first tracking unit has been completed once. For example, the completeness determination unit 205 may reduce the weight, or set the weight to 0, in the likelihood map for the first tracking unit if the completeness of the first tracking unit decreases. The completeness determination unit 205 may reset and retrain the target determiner when the completeness of the first tracking unit decreases. In other words, the completeness determination unit 205 may delete some or all of the already-stored training data from the storage unit 207, and then obtain the training data and perform learning again through the processing of steps S308 and S309.

According to this processing, if the completeness of the first tracking unit changes after the tracking result by the first tracking unit is used for tracking once, it may be determined whether to combine the first tracking unit and the second tracking unit again to according to the changed completeness and track the subject. Accordingly, even outside the initial stage of tracking, a drop in the tracking accuracy can be suppressed by reducing the rate of reflecting the output of a tracking unit having low completeness in the likelihood map (or not using that output for tracking). This assumes, for example, that when the appearance of the tracking target changes drastically during tracking, it may be difficult for even a complete tracking unit to distinguish between the tracking target and the non-tracking target. Here, the completeness determination unit 205 can calculate the completeness using a similar calculation method as in the third variation, for example.

Fifth Variation

The first tracking unit may perform target determination, and detect the tracking target, after the second tracking unit extracts a plurality of candidates for the tracking target. In this example, the result obtainment unit 204 does not first output the likelihood map for the first tracking unit, and only outputs the likelihood map for the second tracking unit. The combination unit 206 detects a region having the highest likelihood in the likelihood map of the second tracking unit as the tracking target if the completeness of the first tracking unit is low. On the other hand, if the first tracking unit has a high completeness, the combination unit 206 first extracts, from the likelihood map of the second tracking unit, regions having a likelihood greater than or equal to a threshold as tracking target candidates. Next, the combination unit 206 performs feature extraction and target determination for each extracted region using the first tracking unit, calculates the likelihoods, and detects the region having the highest likelihood as the tracking target. In addition, in obtaining the training data, the combination unit 206 may assign a label of the tracking target to not only the region detected as the tracking target, but also to regions in the periphery of the stated region.

Sixth Variation

In the present embodiment, the parameters of the first tracking unit are sequentially updated using the gradient method, and the completeness is evaluated based on the detection results using the updated parameters. However, the online learning of the first tracking unit is not limited to this format. For example, the first tracking unit may perform online learning through a tracking method using a plurality of templates, using the method disclosed in Axel Sauer et al., "Tracking Holistic Object Representations" In: BMVC2019. In this case, the information processing apparatus 1 performs learning for the template used for tracking and calculates the completeness according to the learned template. For example, the combination unit 206 can take the online learning as being complete when the number of templates exceeds a predetermined value, or when the variation of the feature amounts of the templates exceeds a predetermined value. Additionally, for example, the completeness determination unit 205 may output a continuous value between 0 and 1 for the completeness of online learning according to the number of templates or variation in the feature amounts of the templates.

Additionally, for example, the first tracking unit may perform online learning for a tracking method that uses the k-nearest neighbor method to track the tracking target. In this case, the completeness determination unit 205 can calculate the completeness of online learning through processing similar to that in the first variation or the second variation.

Second Embodiment

In the first embodiment, at the start of online learning, the completeness of the first tracking unit to perform online learning was set to 0, and the completeness of the second tracking unit that is trained in advance was set to 1. Additionally, the first embodiment described an example in which the completeness of the first tracking unit was set to 1 when the online learning is complete. In the present embodiment too, the information processing apparatus 1 performs processing similar to that in the foregoing example, but sets the completeness of the second tracking unit to 0 when the online learning is complete. In other words, the result obtainment unit 204 tracks the subject using only the likelihood map of the first tracking unit, starting from the next frame after the online learning is complete. Note that in the present embodiment, the tracking processing and the learning processing in the online learning are basically performed through similar processing as that illustrated in FIG. 3 of the first embodiment, and thus redundant descriptions will not be given.

According to this processing, when the online learning is complete, the subject can be tracked using only the first tracking unit, which performs online learning. Accordingly, when the amount of calculations or the amount of data of the parameters of the first tracking unit is smaller than that of the second tracking unit, which does not perform online learning, switching to tracking using only the first tracking unit makes it possible to achieve tracking with a lighter processing load. This makes it possible to increase the speed and save on memory space.

Third Embodiment

The information processing apparatus 1 according to the first embodiment includes two tracking units for tracking a subject, namely the first tracking unit that performs online learning, and the second tracking unit that is trained in advance. On the other hand, while the information processing apparatus according to the present embodiment includes a plurality of tracking units for tracking a subject, the number of other tracking units and the format of those tracking units (whether the units perform online learning or not) are not particularly limited as long as the apparatus includes the first tracking unit that performs online learning. When three or more tracking units are used, the information processing apparatus tracks the subject using each tracking unit in steps S305 to S307, through processing similar to that of the first embodiment. In other words, a likelihood map is obtained from each tracking unit, and whether or not to combine the first tracking unit with other tracking units is determined according to the completeness of the first tracking unit. Note that in the present embodiment, the tracking processing and the learning processing in the online learning are basically performed through similar processing as that illustrated in FIG. 3 of the first embodiment, and thus redundant descriptions will not be given.

Here, the completeness and the likelihood map are output for each tracking unit, and the combination unit 206 may output the final likelihood map to be used for tracking by integrating the respective likelihood maps through weighted summing, using the completeness as a weighting coefficient. The combination unit 206 may determine whether the online learning of the first tracking unit has been completed (whether the completeness is 1 or 0) in a similar manner as in the first embodiment; if the online learning has been completed, the first tracking unit may be used for tracking, and if not, other tracking units may be used for tracking. If the tracking is performed using other tracking units, a tracking unit to be used preferentially among those units may be set in advance, and the tracking unit used for tracking may be selected based on the tracking results. For example, the combination unit 206 can refer to the completeness of each tracking unit and select the tracking unit having the highest completeness as the unit to be used for the tracking.

A situation where the information processing apparatus 1 includes a tracking unit that performs online learning, aside from the first tracking unit (called a "third tracking unit" hereinafter) is also conceivable. In this case, the third tracking unit is trained having provided differences with respect to the first tracking unit in terms of the training data, the resolution of input data, the frequency at which the parameters are updated, or the like. In this case too, the combination unit 206 outputs the final likelihood map based on the likelihood maps of the first tracking unit and the third tracking unit (i.e., not necessarily a single unit). Here, the completeness may be calculated for each tracking unit, and the combination unit 206 may output the final likelihood map by obtaining a weighted sum of the likelihood maps using the respective completenesses as weighting coefficients, or the likelihood map of the tracking unit having the highest completeness may be employed as the final likelihood map.

Furthermore, a situation where the size of the search range differs between the first tracking unit and the third tracking unit is also conceivable. In this case, when the tracking unit having the smaller search range loses sight of the tracking target, switching to tracking using the tracking unit having the larger search range (using the likelihood map of the tracking unit having the larger search range as the final likelihood map) makes it possible to more easily continue the tracking. Although a situation where there are two tracking units is described here, if there are three or more tracking units having different search ranges, the combination unit 206 may switch the tracking units to expand the search range, starting with the tracking unit having the smallest search range. If the tracking target can also be detected by a tracking unit having a smaller search range while tracking using the tracking unit having the larger search range, the combination unit 206 may switch to tracking using the tracking unit having the smaller search range. By reducing the search range for tracking, the possibility of objects similar to the tracking target being present within the search range is reduced, which makes it possible to suppress erroneous tracking.

Here, the completeness determination unit 205 sets the completeness of the tracking unit having the smaller search range ("tracking unit A") to 1 and the completeness of the tracking unit having the larger search range ("tracking unit B") to 0 in the initial stage of tracking. Next, the completeness determination unit 205 calculates a reliability of the tracking result based on the final likelihood map obtained by the result obtainment unit 204, and if the calculated reliability is less than a predetermined value, the completeness of tracking unit A is set to 0, and the completeness of tracking unit B is set to 1. If the reliability then becomes greater than or equal to the predetermined value, the completeness determination unit 205 again sets the completeness of tracking unit A to 1 and the completeness of tracking unit B to 0. The completeness determination unit 205 may, for example, obtain the largest value in the cells of the final likelihood map as the reliability.

According to this processing, the tracking unit to be used can be selected according to the completeness from among a plurality of tracking units, and the likelihood map can be output. The tracking performance can therefore be improved.

Fourth Embodiment

The information processing apparatus 1 according to the present embodiment includes a tracking unit L and a tracking unit S, which both perform online learning, for tracking a subject. The tracking unit L is a tracking unit for which the parameters are updated less frequently than the parameters of the tracking unit S, and which learns changes in the long-term features (e.g., the appearance) of tracking targets and non-tracking targets. On the other hand, the tracking unit S is a tracking unit for which the parameters are updated more frequently than the parameters of the tracking unit L, and which learns sudden changes in the features of tracking targets and non-tracking targets. The tracking unit L and the tracking unit S basically perform online learning processing similar to that of the first tracking unit of the first embodiment, and thus redundant descriptions will not be given.

In the present embodiment, the tracking unit L and the tracking unit S will be described as determining the completeness through processing similar to that described the first variation or the second variation on the first embodiment. In other words, these tracking units determine whether learning is complete according to the number of training sessions, the number of training data, variation of the feature amounts in the training data, or changes in the distribution of feature amounts. Here, it is assumed that the threshold used for this determination in the tracking unit L is set higher than the threshold used in the tracking unit S. By setting the required level of completeness lower in the tracking unit S than in the tracking unit L, the tracking unit can be completed as a tracking unit more easily, which makes more responsive learning possible.

The descriptions of this example assume that the tracking unit S is used instead of the first tracking unit of the first embodiment. In other words, whether to combine the tracking unit S with the tracking unit L and perform tracking is determined according to the completeness of the tracking unit S. However, this determination may be made based on the completeness of the tracking unit L, and the desired settings may be made.

Figure 8:
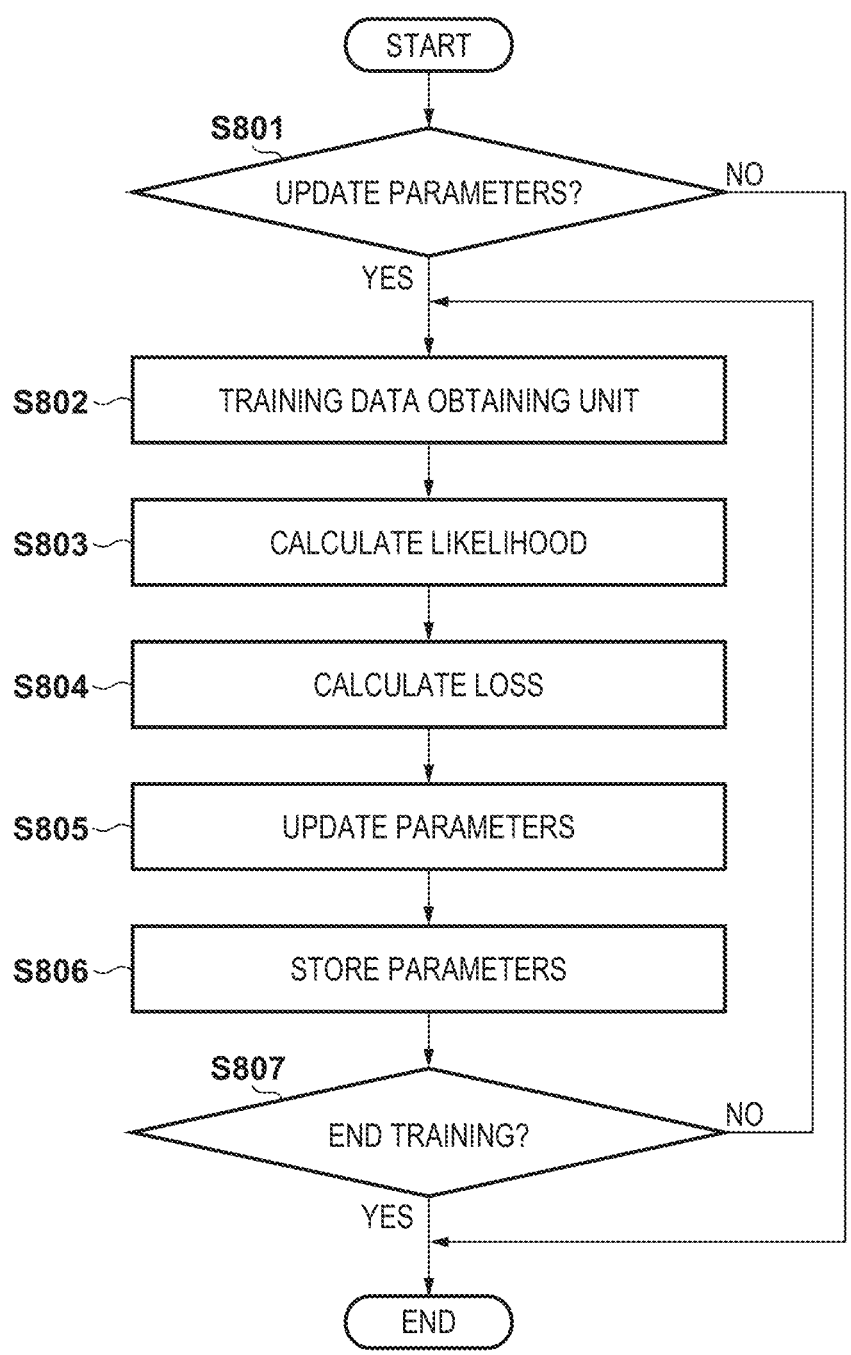
FIG. 8 is a flowchart illustrating an example of a processing method according to a fourth embodiment.

Hereinafter, an example of the learning processing (steps S308 and S309) for the target determiner performed by the combination unit 206 of the information processing apparatus 1 according to the present embodiment will be described with reference to FIG. 8. This processing is performed following the processing of step S307. In step S801, the combination unit 206 controls the timing for updating the parameters for each tracking unit. Here, the combination unit 206 determines whether or not to update the parameters for the tracking unit L and the tracking unit S, respectively. The processing moves to step S802 for a tracking unit for which it is determined that the parameters are to be updated, and ends for a tracking unit for which it is not determined that the parameters are to be updated.

As mentioned above, the parameters are updated more frequently for the tracking unit S than for the tracking unit L in the present embodiment. In the processing illustrated in FIG. 3, a loop of processing for learning is performed until the tracking processing is completed. The frequency at which the parameters of each tracking unit are updated is not particularly limited, but here, it is assumed that the combination unit 206 updates the parameters for each loop of the processing for the tracking unit S, but only in some of the loops of the processing for the tracking unit L. For example, the combination unit 206 may update the parameters of the tracking unit L in a loop where the occurrence of an event indicating that it is more desirable to update the tracking accuracy is detected. The combination unit 206 may update the parameters for the tracking unit L only when, for example, the reliability of the tracking result is low (determined in a similar manner as in the third embodiment). The combination unit 206 may update the parameters of the tracking unit L when a similar object with a higher likelihood of being the tracking target is detected separately from the tracking target in step S305. The combination unit 206 may update the parameters of the tracking unit L at predetermined intervals, e.g., every two loops of the processing.

In step S802, the combination unit 206 obtains training data used for training the target determiner of the tracking unit from the data stored in the storage unit 207. This processing is similar to the processing performed in step S309 of FIG. 3, but the range of data referenced in the storage unit 207 differs between the tracking unit L and the tracking unit S. The combination unit 206 obtains the training data obtained from the current time to N time previous, in order, for the tracking unit L, and obtains the training data obtained from the current time to M time previous (N>M), in order, for the tracking unit S. The subsequent process of updating the parameters is performed in a similar manner to the processing in step S309 of FIG. 3, and will therefore not be described.

According to this processing, online learning in which the frequencies of parameter updates are different for each tracking unit can be performed, and whether or not to perform tracking having combined the tracking units can be determined according to the completeness of the learning. By using the tracking unit L, tracking can be performed for the tracking target/non-tracking target based on features that are maintained over a long period of time (and therefore do not change easily). In addition, by using the tracking unit S, which is trained using only data collected over a shorter period of time than the tracking unit L, the tracking performance can be improved by quickly responding to sudden changes in the features of the tracking target/non-tracking target.

Additionally, when the reliability of the tracking result of the tracking unit being used for tracking is low, the combination unit 206 may switch to use a tracking unit for which the parameters are updated more frequently than the stated tracking unit. By switching the tracking unit used for tracking to a tracking unit for which the parameters are updated more frequently, early improvements can be expected to be seen even when the reliability of the tracking result is low.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-073655, filed Apr. 23, 2021, which is hereby incorporated by reference herein in its entirety.

What is claimed is:

1. An information processing apparatus comprising:
a tracking unit configured to, at an initial stage of tracking a subject in an input image, track the subject using only a pretrained second discriminator that tracks the subject, and, from a middle stage of the tracking, track the subject using either or both of a first discriminator that tracks the subject and is different from the second discriminator, and the second discriminator;
an obtaining unit configured to obtain training data including data other than the subject used for training to track with the first discriminator;
a learning unit configured to perform online learning of causing the first discriminator to learn while tracking the subject using the training data;
an evaluating unit configured to evaluate a learning state of the online learning; and
a determination unit configured to determine whether or not the tracking unit is to use the first discriminator to track the subject according to the evaluation of the learning state,
wherein the evaluating unit evaluates the learning state of the online learning based on an amount of change in a variance in the feature amounts of the training data when training data is newly input in the online learning.

2. The information processing apparatus according to claim 1, wherein the evaluating unit evaluates the learning state of the online learning according to a learning status of the online learning.

3. The information processing apparatus according to claim 2, wherein the evaluating unit evaluates the learning state of the online learning based on tracking results by the first discriminator from before and after new training data is input in the online learning.

4. The information processing apparatus according to claim 3, further comprising:
a calculation unit configured to calculate loss in the tracking result based on the training data and a tracking result output when the training data is taken as input,
wherein the evaluating unit evaluates the learning state of the online learning based on an amount of change between the loss calculated in the first discriminator before performing the online learning and the loss calculated in the first discriminator after performing the online learning when training data is newly input in the online learning.

5. The information processing apparatus according to claim 2, wherein the evaluating unit evaluates the learning state of the online learning based on a distribution of each of feature amounts of the training data.

6. The information processing apparatus according to claim 2, wherein a reliability of a tracking result by the tracking unit is used as the learning status of the online learning.

7. The information processing apparatus according to claim 6, further comprising:
a first generating unit configured to generate a first likelihood map indicating a likelihood of the subject for each of regions within the input image,
wherein the reliability is set based on the likelihood of the subject indicated by the first likelihood map.

8. An information processing apparatus comprising:
a tracking unit configured to, at an initial stage of tracking a subject in an input image, track the subject using only a pretrained second discriminator that tracks the subject, and, from a middle stage of the tracking, track the subject using either or both of a first discriminator that tracks the subject and is different from the second discriminator, and the second discriminator;
an obtaining unit configured to obtain training data including data other than the subject used for training to track with the first discriminator;
a learning unit configured to perform online learning of causing the first discriminator to learn while tracking the subject using the training data;
an evaluating unit configured to evaluate a learning state of the online learning;
a determination unit configured to determine whether or not the tracking unit is to use the first discriminator to track the subject according to the evaluation of the learning state;
a first generating unit configured to generate a first likelihood map indicating a likelihood of the subject for each of regions within the input image;
a second generating unit configured to generate a second likelihood map indicating a likelihood of the subject for each of regions within the input image, by the first discriminator; and
a third generating unit configured to generate a third likelihood map indicating a likelihood of the subject for each of regions within the input image, by the second discriminator,
wherein the evaluating unit evaluates the learning state of the online learning according to a learning status of the online learning;
a reliability of a tracking result by the tracking unit is used as the learning status of the online learning;
the reliability is set based on the likelihood of the subject indicated by the first likelihood map; and
the first generating unit generates the first likelihood map using the second likelihood map and the third likelihood map.

9. The information processing apparatus according to claim 8, wherein when the determination unit determines to use the first discriminator to track the subject, the first generating unit generates the first likelihood map by integrating the second likelihood map and the third likelihood map using a weight based on the learning state.

10. The information processing apparatus according to claim 8, wherein the first generating unit:
sets the third likelihood map as the first likelihood map when the determination unit determines not to use the first discriminator to track the subject; and
sets the second likelihood map as the first likelihood map when the determination unit determines to use the first discriminator to track the subject.

11. The information processing apparatus according to claim 2,
wherein the evaluating unit evaluates the learning state using a binary discrimination as to whether or not the online learning is complete, and
the determination unit determines not to use the first discriminator to track the subject when the online learning is determined not to be complete, and determines to use the first discriminator to track the subject when the online learning is determined to be complete.

12. The information processing apparatus according to claim 11, wherein the tracking unit tracks the subject using only the second discriminator when the first discriminator is determined not to be used, and tracks the subject using only the first discriminator when the first discriminator is determined to be used.

13. The information processing apparatus according to claim 11, wherein the evaluating unit determines that the online learning is not complete when the reliability of the tracking result by the tracking unit is less than a predetermined threshold, and determines that the online learning is complete when the reliability of the tracking result by the tracking unit is greater than or equal to the predetermined threshold.

14. An information processing apparatus comprising:
a tracking unit configured to, at an initial stage of tracking a subject in an input image, track the subject using only a pretrained second discriminator that tracks the subject, and, from a middle stage of the tracking, track the subject using either or both of a first discriminator that tracks the subject and is different from the second discriminator, and the second discriminator;
an obtaining unit configured to obtain training data including data other than the subject used for training to track with the first discriminator;
a learning unit configured to perform online learning of causing the first discriminator to learn while tracking the subject using the training data;
an evaluating unit configured to evaluate a learning state of the online learning; and
a determination unit configured to determine whether or not the tracking unit is to use the first discriminator to track the subject according to the evaluation of the learning state,
wherein a search range in which to search for the subject is different between the first discriminator and the second discriminator, and
the information processing apparatus further comprises a switching unit configured to:
switch the discriminator used by the tracking unit to the discriminator, among the first discriminator and the second discriminator, having a larger search range when the subject is no longer detected while the tracking unit is using the discriminator, among the first discriminator and the second discriminator, having a smaller search range, to track the subject; and
switch the discriminator used by the tracking unit to the discriminator having a smaller search range when the subject can be detected even by the discriminator having the smaller search range while the tracking unit is using the discriminator having the larger search range to track the subject.

15. The information processing apparatus according to claim 1, wherein the second discriminator is a discriminator trained in advance to track the subject.

16. The information processing apparatus according to claim 1, wherein the second discriminator is a discriminator which is trained through online learning performed by the second discriminator while tracking the subject, and for which an update frequency of a parameter by the online learning is different from the first discriminator.

17. The information processing apparatus according to claim 16, wherein the tracking unit switches to perform tracking using only the discriminator, among the first discriminator and the second discriminator, having a higher update frequency when the reliability of the tracking result by the tracking unit is low while using both the first discriminator and the second discriminator to track the subject.

18. The information processing apparatus according to claim 16, wherein a length of a period of collecting training data to use in online learning is different between the first discriminator and the second discriminator.

19. An information processing method comprising:
at an initial stage of tracking a subject in an input image, tracking the subject using only a pretrained second discriminator that tracks the subject, and, from a middle stage of the tracking, track the subject using either or both of a first discriminator that tracks the subject and is different from the second discriminator, and the second discriminator;
obtaining training data used for training to track with the first discriminator;
performing online learning of causing the first discriminator to learn while tracking the subject using the training data;
evaluating a learning state of the online learning; and
determining whether or not to use the first discriminator to track the subject according to the evaluation of the learning state in the tracking,
wherein the learning state of the online learning is evaluated based on an amount of change in a variance in the feature amounts of the training data when training data is newly input in the online learning.

20. A non-transitory computer-readable storage medium storing a program that, when executed by a computer, causes the computer to perform an information processing method, the information processing method comprises:
at an initial stage of tracking a subject in an input image, tracking the subject using only a pretrained second discriminator that tracks the subject, and, from a middle stage of the tracking, track the subject using either or both of a first discriminator that tracks the subject and is different from the second discriminator, and the second discriminator;
obtaining training data used for training to track with the first discriminator;
performing online learning of causing the first discriminator to learn while tracking the subject using the training data;
evaluating a learning state of the online learning; and
determining whether or not to use the first discriminator to track the subject according to the evaluation of the learning state in the tracking,
wherein the learning state of the online learning is evaluated based on an amount of change in a variance in the feature amounts of the training data when training data is newly input in the online learning.

* * * * *